US008949362B2

(12) United States Patent
Morris

(10) Patent No.: US 8,949,362 B2
(45) Date of Patent: *Feb. 3, 2015

(54) METHODS, SYSTEMS, AND COMPUTER PROGRAM PRODUCTS FOR PROCESSING A REQUEST FOR A RESOURCE IN A COMMUNICATION

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/218,870

(22) Filed: Mar. 18, 2014

(65) Prior Publication Data

US 2014/0201300 A1    Jul. 17, 2014

Related U.S. Application Data

(63) Continuation of application No. 13/867,040, filed on Apr. 20, 2013, which is a continuation of application No. 12/833,014, filed on Jul. 9, 2010, now Pat. No. 8,447,819.

(51) Int. Cl.
*G06F 15/16* (2006.01)
*H04L 12/58* (2006.01)

(52) U.S. Cl.
CPC .............. *H04L 51/08* (2013.01); *H04L 12/584* (2013.01); *H04L 12/58* (2013.01)
USPC ............ 709/206; 709/204; 709/205; 709/207

(58) Field of Classification Search
CPC ....... H04L 12/58; H04L 12/584; H04L 51/08; H04L 63/04; H04L 63/083
USPC .................................................. 709/204–207
See application file for complete search history.

(56) References Cited

U.S. PATENT DOCUMENTS 7,133,897 B1    11/2006    Tran
7,209,953 B2    4/2007    Brooks
(Continued)

FOREIGN PATENT DOCUMENTS

WO    02/77773    3/2002

OTHER PUBLICATIONS

Freed, N, et al, "Multipurpose Internet Mail Extensions (MIME) Part 1: Format of Internet Message Bodies", RFC 2045, Nov. 1996, IETF.

(Continued)

*Primary Examiner* — Razu Miah
(74) *Attorney, Agent, or Firm* — Patrick E. Caldwell, Esq.; The Caldwell Firm, LLC

(57) ABSTRACT

A system, method, and computer program product is included for receiving a criterion at a first node via at least one network; in response to the criterion, sending from the first node via the at least one network a first signal to a second node including a first message; receiving at the first node via the at least one network a second signal from the second node including the content that is included in the second signal based on a schema defining at least one of a format and a vocabulary for processing, and including a second message; and in response to the second signal, presenting at least a portion of the content in connection with the second message.

26 Claims, 10 Drawing Sheets

(56) References Cited

U.S. PATENT DOCUMENTS

| | | | |
|---|---|---|---|
| 7,890,591 B2* | 2/2011 | Agrawal et al. | 709/206 |
| 7,904,594 B2* | 3/2011 | Spicer et al. | 709/246 |
| 7,908,332 B2* | 3/2011 | Malik | 709/206 |
| 8,359,361 B2* | 1/2013 | Thornton et al. | 709/206 |
| 2003/0097415 A1* | 5/2003 | Laux et al. | 709/206 |
| 2004/0064478 A1 | 4/2004 | Canesi | |
| 2004/0186894 A1 | 9/2004 | Jhingan | |
| 2005/0010646 A1 | 1/2005 | Shiina | |
| 2005/0102348 A1* | 5/2005 | Parsons et al. | 709/201 |
| 2005/0114664 A1* | 5/2005 | Davin | 713/170 |
| 2005/0114671 A1 | 5/2005 | Little et al. | |
| 2006/0095531 A1 | 5/2006 | Cho | |
| 2006/0155819 A1* | 7/2006 | Grabinar et al. | 709/213 |
| 2006/0256934 A1* | 11/2006 | Mazor | 379/88.01 |
| 2007/0078902 A1 | 4/2007 | Buschi | |
| 2007/0244975 A1* | 10/2007 | Dillon et al. | 709/206 |
| 2008/0120382 A1* | 5/2008 | Heidloff et al. | 709/206 |
| 2008/0201364 A1 | 8/2008 | Buschi | |
| 2008/0256199 A1* | 10/2008 | Pesala | 709/206 |
| 2009/0222450 A1 | 9/2009 | Zigelman | |
| 2010/0011077 A1 | 1/2010 | Shkolnikov | |
| 2010/0070602 A1 | 3/2010 | Malik | |
| 2011/0276637 A1* | 11/2011 | Thornton et al. | 709/206 |

OTHER PUBLICATIONS

Resnick, E, "Internet Message Format", RFC 5322, Oct. 2008, IETF.

Office Action Summary in U.S. Appl. No. 12/833,014 dated Aug. 2, 2012.

Notice of Allowance in U.S. Appl. No. 12/833,014 dated Jan. 23, 2013.

Office Action Summary in U.S. Appl. No. 12/833,016 dated Sep. 20, 2012.

Office Action Summary in U.S. Appl. No. 12/833,016 dated May 10, 2013.

Office Action Summary in U.S. Appl. No. 12/833,016 dated Feb. 14, 2014.

* cited by examiner

900a

MIME-Version: 1.0
Content-Type: multipart/mixed; boundary="--OoOT----toOo--------"

--OoOT----toOo--------
Content-Type: text/plain
Hi, this is the first message
--OoOT----toOo--------
Content-Type: application/attachment-query
Accept: image/*
<attachment-query>
　<and>
　　<criterion attribute="content" type="regex" match-value="[0-9]{3,3}[A-Za-z]+" />
　　<criterion attribute="name" type="fileex" match-value="2010*.xlsx" />
　　<criterion attribute="owner" type="stringex" match-value="J. J. Cash" />
　　<criterion attribute="modified" type="dateex" match-value="20100514,30d" />
　　<criterion attribute="created" type="dateex" match-value="2008001,current" />
　　<criterion attribute="tag" type="string" match-value="IT, hardware" />
　</and>
</attachment-query>
--OoOT----toOo--------

MIME-Version: 1.0
Content-Type: multipart/mixed; boundary="--toOo----OoOt--------"

--toOo----OoOt---------
Content-Type: text/plain
--toOo----OoOt---------

Content-Type: image/png

Content-Transfer-Encoding: base64

PGh0bWw+CiAgPGhlYWQ+CiAgPC9oZWFkPgogICAgIDxib2R5Pgog
ICAgPHA+VGhpcyBpcyB0aGUgYm9keSB2ZiB0aGUgbWVzc2Fn
ZS48L3A+CiAgPC9ib2R5Pgo8L2h0bWw+Cg== . . .
--toOo----OoOt---------

Fig. 9b

METHODS, SYSTEMS, AND COMPUTER PROGRAM PRODUCTS FOR PROCESSING A REQUEST FOR A RESOURCE IN A COMMUNICATION

RELATED APPLICATIONS

This is a continuation of U.S. patent application Ser. No. 13/867,040, filed on 2013/04/20, which is a continuation of U.S. patent application Ser. No. 12/833,014, filed on 2010/07/09, now U.S. Pat. No. 8,447,819.

This application is related to the following commonly owned U.S. patent application, the entire disclosure being incorporated by reference herein: application Ser. No. 12/833,016, filed on Sep. 7, 2010, entitled "Methods, Systems, and Program Products for Referencing an Attachment in a Communication".

BACKGROUND

While receiving attachments in a network communication, such as email, is common, most attachments received are unsolicited or unrequested. To request a resource in an attachment, a user typically sends the request as voice and/or text data in a voice and/or text message heard and/or read by another user. The request may be as vague or as specific as the language used by the requesting user. The other user must interpret the request and find a resource that seems to match the request. The other user in many cases locates a "matching" resource using a program or application other than the communications agent that received the request. For example, a search program may be used to search a hard-drive by the other user. The other user must enter the search criteria.

Accordingly, there exists a need for methods, systems, and computer program products for processing a request for a resource in a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for processing a request for a resource in a communication. In one aspect, the method includes receiving a resource criterion for requesting a resource via a first communication including a message portion including a first message addressed to a first user represented by a first node. The method further includes sending, via a network to the first node, the first communication including a request portion that includes an attachment request based on the resource criterion. The method still further includes receiving, by a second node representing a second user, a second communication including, based on the request portion, the resource, as an attachment, and a second message addressed to the second user.

Further, a system for processing a request for a resource in a communication is described. The system includes an execution environment including an instruction-processing unit configured to process an instruction included in at least one of a criterion handler component, a query generator component, and a content manager component. The system includes the criterion handler component configured for receiving a resource criterion for requesting a resource via a first communication including a message portion including a first message addressed to a first user represented by a first node. The system further includes the query generator component configured for sending, via a network to the first node, the first communication including a request portion that includes an attachment request based on the resource criterion. The system still further includes the content manager component configured for receiving, by a second node representing a second user, a second communication including, based on the request portion, the resource, as an attachment, and a second message addressed to the second user.

In another aspect, a method for processing a request for a resource in a communication is described that includes receiving, via a network by a first node, a first communication including a first message addressed to a first user. The method further includes detecting, by the first node, an attachment request included in the first communication. The method still further includes locating a resource based on the attachment request. The method also includes sending, to a second node, a second communication including the located resource, as an attachment, and including a second message addressed to a second user.

Still further, a system for processing a request for a resource in a communication is described. The system includes an execution environment including an instruction-processing unit configured to process an instruction included in at least one of a com-in component, a query content handler component, a resource location component, and an access director component. The system includes the com-in component configured for receiving, via a network by a first node, a first communication including a first message addressed to a first user. The system further includes the query content handler component configured for detecting, by the first node, an attachment request included in the first communication. The system still further includes the resource location component configured for locating a resource based on the attachment request. The system also includes the access director component configured for sending, to a second node, a second communication including the located resource, as an attachment, and including a second message addressed to a second user.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 9a illustrates an exemplary communication between a first node and a second node according to an aspect of the subject matter described herein; and FIG. 9b illustrates an exemplary communication between a first node and a second node according to an aspect of the subject matter described herein.

DETAILED DESCRIPTION

Figure 1:
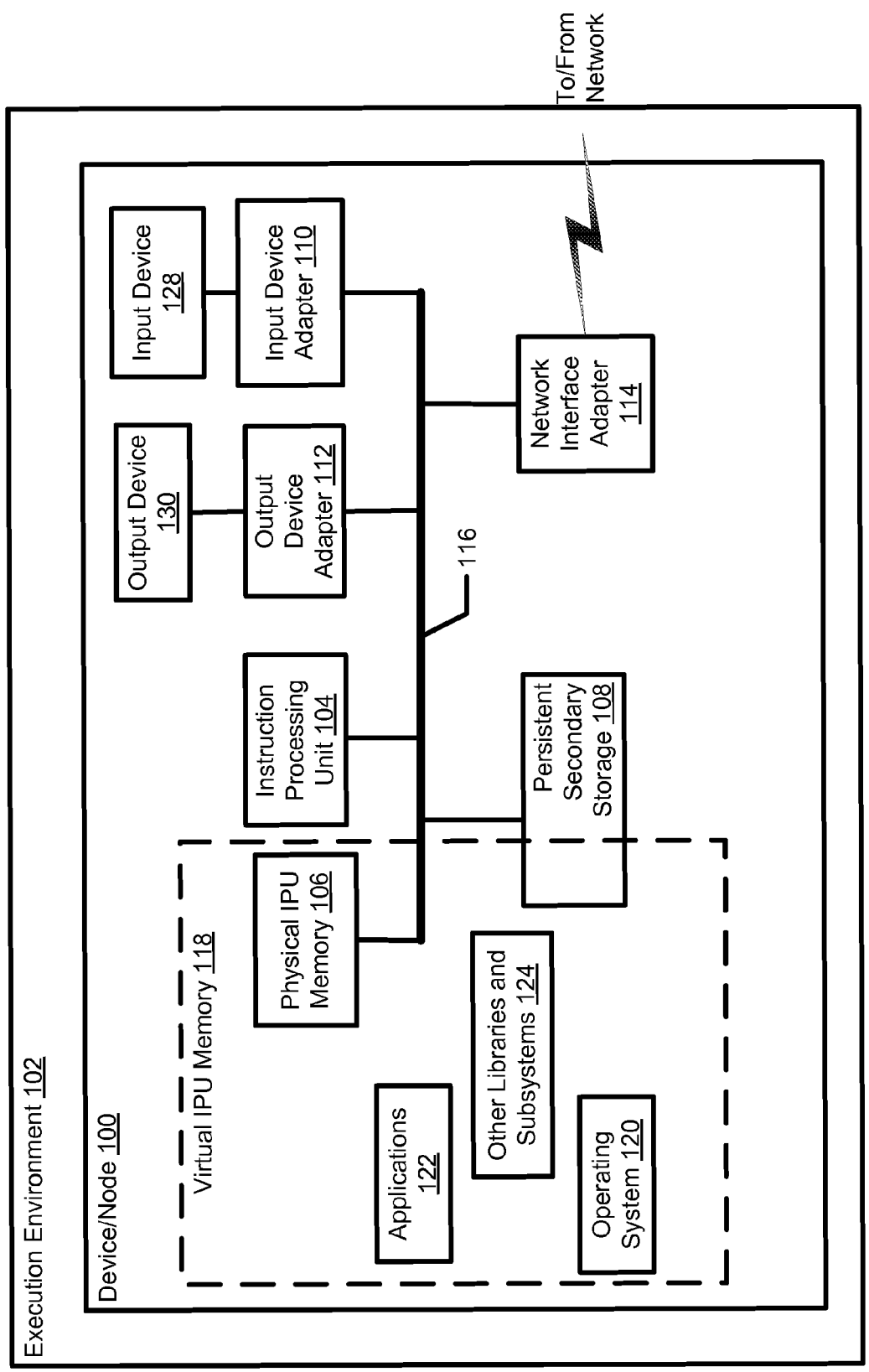
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage 108 may include removable media. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "device" and "node" as used herein respectively refer to one or more devices and nodes providing and/or otherwise included in an execution environment unless clearly indicated otherwise.

As used herein, the term "communication" refers to data for sending, sent, and/or received via a network between communicants. A communication includes a message portion addressed to a receiving communicant. A communication is sent to a communicant to present a message in the message portion to the communicant. The term "communicant" as used herein refers to a user represented in a communication. A communicant or user is represented by a "communications agent" configured to operate in an execution environment, on behalf of the represented communicant, to send data to and/or receive data from another communications agent according to a communications protocol via a network. A communications protocol defines and/or otherwise identifies an address space including communications addresses for delivering data sent in a communication from one communications agent to another.

The term "communicant alias" as used herein refers to an identifier of a communicant in a communication where the communicant alias is not a communications address included in an address space of a communications protocol for sending and/or receiving data in the communication.

Figure 2:
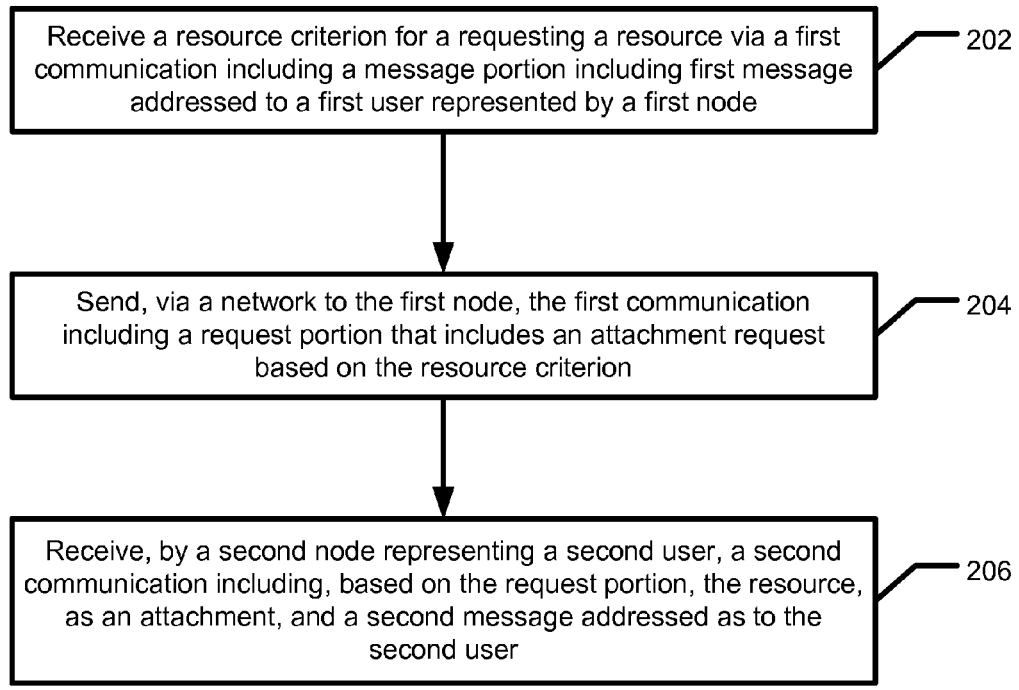
FIG. 2 is a flow diagram illustrating a method for processing a request for a resource in a communication according to an aspect of the subject matter described herein.
Figure 4A:
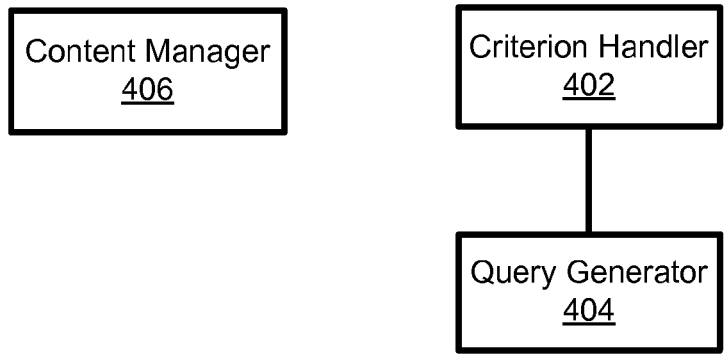
FIG. 4*a* is a block diagram illustrating an arrangement of components for processing a request for a resource in a communication according to another aspect of the subject matter described herein.
Figure 5:
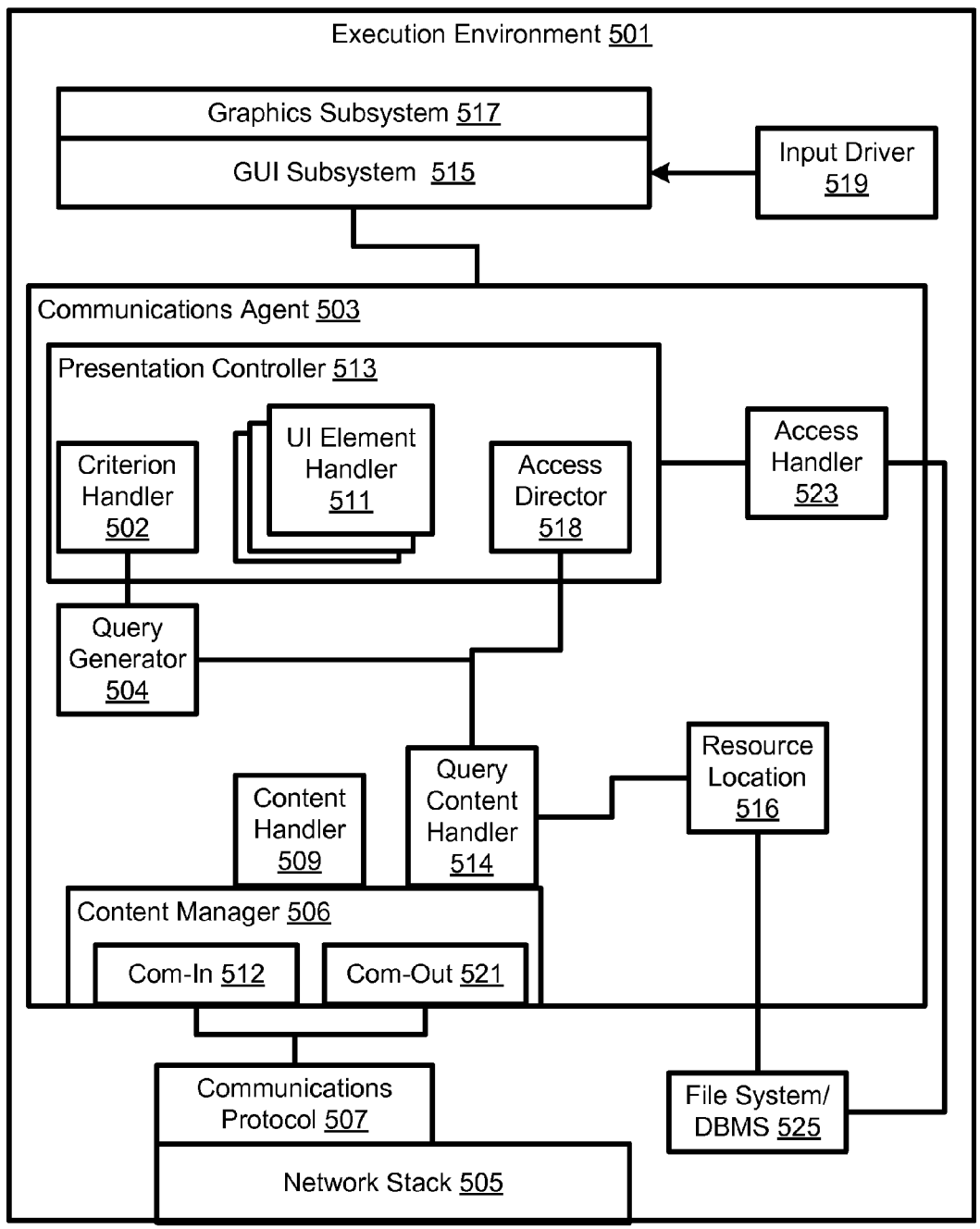
FIG. 5 is a block diagram illustrating an arrangement of components for performing a method according to another aspect of the subject matter described herein.

The block diagram in FIG. 4a illustrates an exemplary system for processing a request for a resource in a communication according to the method illustrated in FIG. 2. A system for performing the method illustrated in FIG. 2 includes an execution environment, including an instruction-processing unit, configured to process an instruction included in at least one of a criterion handler component 402, a query generator component 404, and a content manager component 406 as illustrated in FIG. 4a. Some or all of the exemplary components illustrated in FIG. 4a may be adapted for performing the method illustrated in FIG. 2 in a number of execution environments. FIG. 5 illustrates a block diagram including the components of FIG. 4a and/or analogs of the components of FIG. 4a respectively adapted for operation in execution environment 501, which includes or otherwise is provided by one or more nodes.

Figure 3:
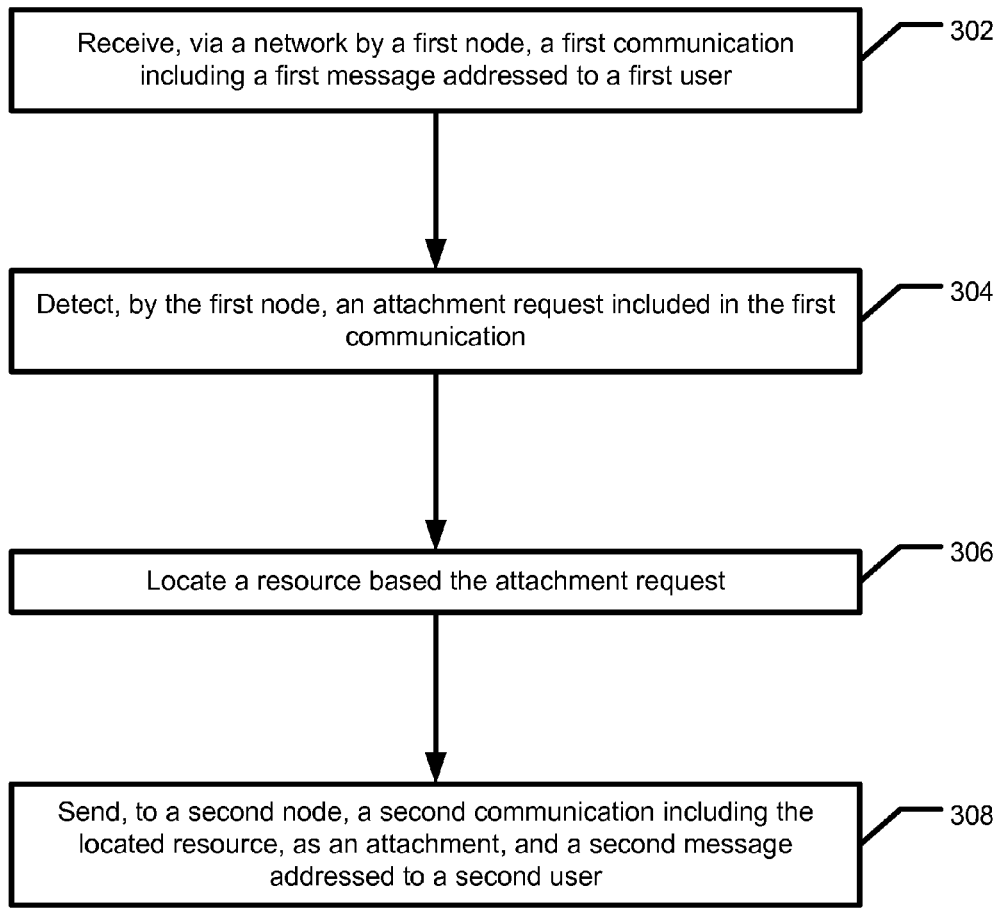
FIG. 3 is a flow diagram illustrating a method for processing a request for a resource in a communication according to an aspect of the subject matter described herein.
Figure 4B:
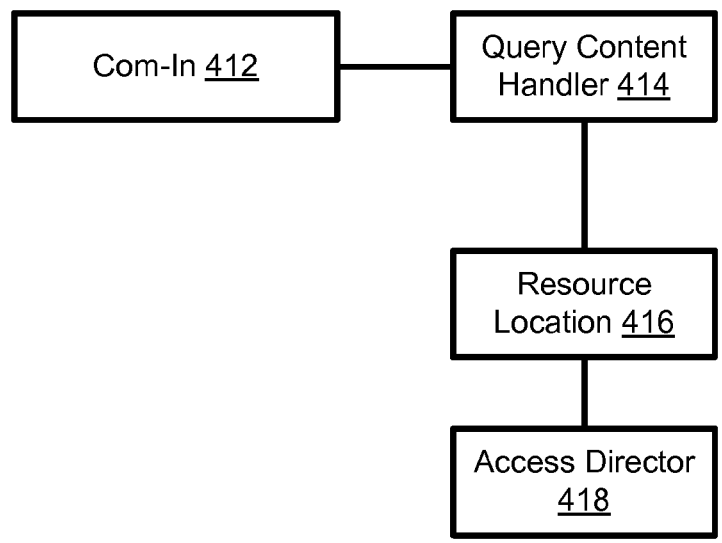
FIG. 4*b* is a block diagram illustrating an arrangement of components for processing a request for a resource in a communication according to another aspect of the subject matter described herein.

The block diagram in FIG. 4b illustrates an exemplary system for processing a request for a resource in a communication according to the method illustrated in FIG. 3. A system for performing the method illustrated in FIG. 3 includes an execution environment, including an instruction-processing unit, configured to process an instruction in at least one of a com-in component 412, a query content handler component 414, a resource location component 416, and an access director component 418 illustrated in FIG. 4b. Some or all of the exemplary components illustrated in FIG. 4b may be adapted for performing the method illustrated in FIG. 3 in a number of execution environments. FIG. 5 is a block diagram illustrating the components of FIG. 4b and/or analogs of the components of FIG. 4b adapted for operation in execution environment 501, which includes or otherwise is provided by one or more nodes.

FIG. 1 illustrates components of an exemplary device/node that may at least partially provide and/or otherwise be included in an execution environment. The components illustrated in FIG. 5 may be included in or otherwise combined with the components of FIG. 1 to create a variety of arrangements of components according to the subject matter described herein.

Figure 6:
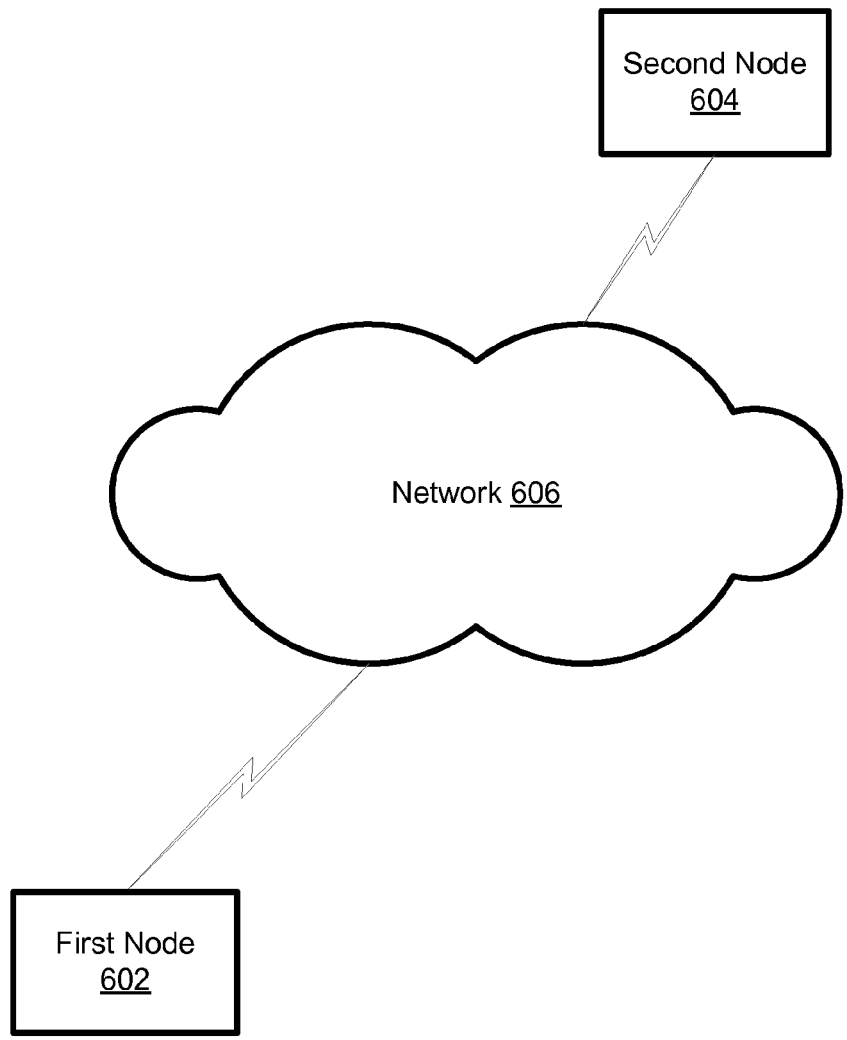
FIG. 6 is a network diagram illustrating an exemplary system according to another aspect of the subject matter described herein.

FIG. 6 illustrates first node 602 as an exemplary device included in and/or otherwise adapted for providing an instance and/or adaptation of execution environment 501 in FIG. 5. Second node 604 also illustrates a device that may be included in and/or otherwise adapted for providing an instance and/or adaptation of execution environment 501. FIG. 6 also illustrates that first node 602 and second node 604 are operatively coupled to network 606 via respective network interface components enabling first node 602 and second node 604 to communicate.

Execution environment 501 is illustrated in FIG. 5 hosting communications agent 503. A first instance and/or analog of communications agent 503 may operate in first node 602 and a second instance and/or analog may operate in second node 604. Components in FIG. 5 are referenced for illustrative purposes in describing communications agents operating in an execution environment of first node 602 and an execution environment of second node 604. Exemplary communications agents include email clients, phone clients including Voice over Internet Protocol (VoIP) clients, instant messaging clients, multi-media communications clients including video phone clients, and other data transfer agents.

FIG. 5 illustrates communications agent 503 including an adaptation of the arrangement of components in FIG. 4a and an adaptation of the arrangement of components in FIG. 4b. A first communications agent 503 may operate, in first node 602, on behalf of a first communicant to communicate with a second communicant represented by a communications agent operating in second node 604. Another instance and/or analog of communications agent 503 may operate in an execution environment of second node 604 on behalf of the second communicant.

As stated, the various adaptations of the arrangement in FIG. 4a as well as the various adaptations of the arrangement in FIG. 4b illustrated and described herein are not exhaustive. For example, those skilled in the art will see based on the description herein that arrangements of components for performing the method illustrated in FIG. 2 and/or in FIG. 3 may be distributed across more than one node and/or execution environment. For example, such an arrangement may operate at least partially in a communications agent in a user node and at least partially in a server node interoperating with the user node.

FIG. 5 illustrates network stack 505 configured for sending and/or receiving data in a communication via network 606 in FIG. 6. First node 602 and second node 604 may be operatively coupled to network 606 via respective, network interface components. Network stacks in first node 602 and in second node 604 may support the same protocol suite, such as TCP/IP, or may communicate via a network gateway or other protocol translation device and/or service.

Communications agents 503 in FIG. 5, respectively operating in first node 602 and in second node 604 in FIG. 6 may interoperate via their respective network stacks 505. Communications agents 503 may communicate via one or more communications protocols. FIG. 5 illustrates communications protocol component 507 exemplifying a subsystem for exchanging data via network 606 according to one or more communications protocols, such as simple mail transfer protocol (SMTP), an instant messaging protocol, and/or a real-time voice and/or video protocol. A communication between communications agents 503 in first node 602 and second node 604 may include more than one type of data and may use one or more communications protocols for exchanging the one or more types of data via network 606.

Communications agents 503 in FIG. 5, in first node 602, and in second node 604, respectively, may communicate via discrete messages, a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, a secure protocol, and/or an unsecure protocol, to name a few communications options.

FIG. 5 illustrates communications agent 503 including content manager component 506. Content manager component 506 in first node 602 may interoperate with communications protocol layer component 507 and/or network stack 505 to receive data in one or more communications via network 606 with second node 604. Content manager component 506 includes and/or otherwise interoperates with com-in component 512 operatively coupling communications agent 503 to an interface of communications protocol component 507 for receiving the data from second node 604. Second node 604 may include an adaptation or analog of communications agent 503 including an adaptation and/or analog of com-in component 512 for receiving data from first node 602 in a communication.

Data received in a communication may include one or more resources and/or content types. Exemplary content types include plain text, markup such as hypertext markup language (HTML), audio data, image data, and/or executable data. Executable data may include script instruction(s), byte code, and/or machine code. In FIG. 5, communications agent 503 includes one or more content handler components 509 to process data received according to its content type. A data type may be identified by a MIME type identifier. Exemplary content handler components 509 include a text/html content handler component for processing HTML representations; an application/xmpp-xml content handler component for processing extensible messaging and presence protocol (XMPP) streams including presence tuples, instant messages, and audio content handlers including and/or configured to retrieve suitable codices; one or more video content handler components for processing video representations of various types; and still image data content handler components for processing various image data representations. Content handler component(s) 509 process received data representations and may provide transformed data from the representations to one or more user interface element handler components 511.

User interface element handler components 511 are illustrated in presentation controller component 513 in FIG. 5.

Presentation controller component 513 may manage visual, audio, and other types of output for its including application as well as receive and route detected user and other inputs to components and extensions of its including application, communications agent 503. With respect to FIG. 5, a user interface element handler component 511 may be adapted to operate at least partially in a content handler component 509 such as a text/html content handler component and/or a script content handler component. Additionally or alternatively, a user interface element handler component in execution environment 501 may be received in a communication. For example, an email may include one or more script instructions.

Figure 7A:
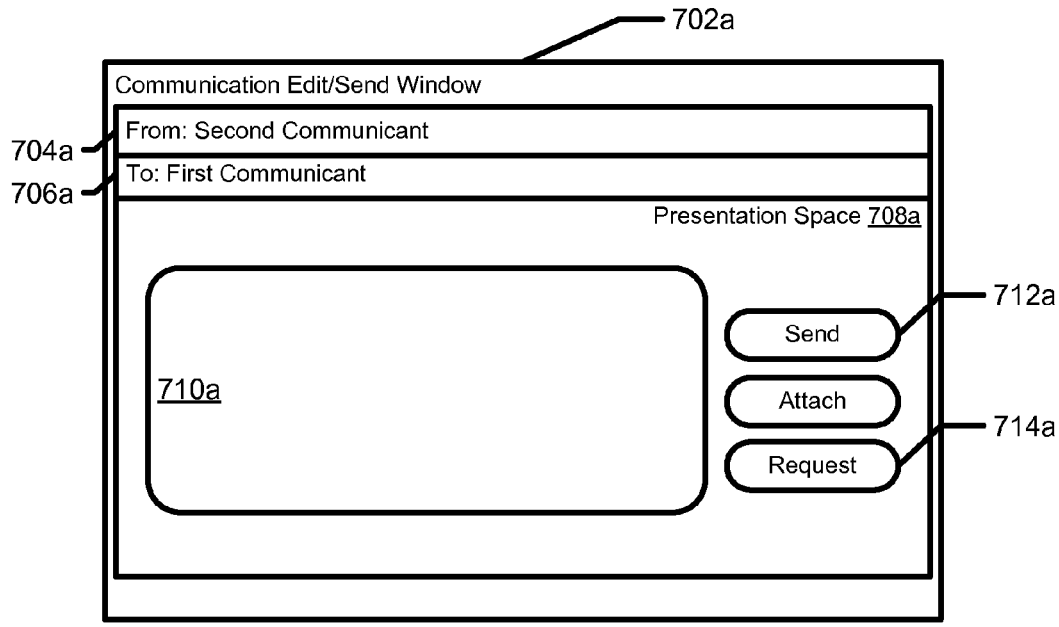
FIG. 7a is a diagram illustrating a user interface presented via a display according to another aspect of the subject matter described herein.

FIG. 7*a* illustrates an exemplary communication edit/send window 702*a* presentable in a presentation space of a display device, such as output device 130 in FIG. 1. Communication edit/send window 702*a* includes a sender UI element 704*a* for presenting a communicant identifier of a communicant represented by the communications agent presenting communication edit/send window 702*a*. Communication edit/send window 702*a* also includes a recipient UI element 706*a* for presenting one or more communicant identifier(s) identifying one or more communicant(s) included in the communication represented by communications agents operating in other nodes. Presentation space 708*a* is provided in first communication edit/send window 702*a* for presenting a message UI element 710*a* for presenting a message exchanged and/or for exchanging in the communication. FIG. 7*a* also illustrates presentation space 708*a* including one or more communications controls for exchanging data in and/or otherwise managing the communication. Send button 712*a* illustrates an exemplary control for sending data in the communication to one or more identified remote communicants.

The term "attachment" as used herein refers to a portion of a communication that includes data from one communicant to another other than data in the message portion. A resource sent as an attachment is data that is typically not presented "inline" or in a message included in a message portion of a communication. Email attachments are perhaps the most widely known attachments included in communications. An email attachment is a file or other resource sent along with an email in a portion of the email separate from a message portion. As defined, other types of text communications as well as voice and video communications may include attachment portions. A communication may include one or more resources as one or more attachments.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the exemplary elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats including image formats such as JPEG, video formats such as MP4, markup language data such as HTML and other markup based languages, and/or instructions such as those defined by various script languages, byte code, and/or machine code. For example, a voice communication for receiving by a communications agent and/or for sending by a communications agent may be included in a media container having a specified format, such as MPEG4, and may be compressed, encrypted, and/or otherwise encoded. The data is communicated for presenting in and/or by one or more user interface elements included in a user interface of a communications agent included in the communication. Components configured to send information representing one or more program entities for presenting particular types of output by particular types of output devices include visual interface element handler components, audio interface element handler components, tactile interface element handler components, and the like.

A representation of a program entity may be presented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output device adapter device, and/or a storage medium of an output device. A screen of a display, for example, is a presentation space.

As used herein, the terms "program", "program component", "application", "application component", "executable", and "executable component" refer to any data representation that may be translated into a set of machine code instructions and optional associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition includes machine code and virtual machine code, such as Java™ byte code.

Various user interface elements illustrated in FIG. 7*a* presented by communications agent 503 may be presented by one or more user interface element handler components 511. User interface element handler component(s) 511 in FIG. 5 may send presentation information representing visual interface element(s), such as sender UI element 704*a* in FIG. 7*a*, to GUI subsystem 515. GUI subsystem 515 may instruct graphics subsystem 517 to draw the visual interface element(s) in a region of an output device, included in execution environment 501 of a node, based on the presentation information received in and/or generated from data received in the communication.

Input may be received via input driver 519 in FIG. 5. For example, a user may move a mouse to move a pointer presented in a display of first node 602 over send button 712a. The user may provide an input detected by the mouse. The detected input may be received by GUI subsystem 515 via input driver 519 as a send command indicator based on the association of the shared location of the pointer and the send button 712a in the presentation space of the display.

Data to send in a communication to a remote communications agent may be received by one or more content handler component(s) 509 to transform the data into one or more representations suitable for transmitting in the communication and/or suitable for processing by the remote communications agent. The one or more data representations may be provided to content manager component 506 for sending in the communication. Content manager component 506 may package the one or more data representations in a message formatted according to the communications protocol provided by communications protocol component 507. Content manager component 506 may alternatively or additionally encode and/or otherwise transform one or more of the data representations for sending in a data stream such as voice stream and/or a video stream for communicating in the communication to the remote communications agent.

Content manager component 506 may provide the packaged, encoded, and/or transformed data to communications protocol component 507 via com-out component 521. Com-out component 521 illustrates a component in communications agent 503 for operatively coupling communications agent 503 to communications protocol component 507 according to an interface provided by communications protocol component 507 for sending data in a communication according to a communications protocol embodied in communications protocol component 507. Communications protocol component 507 may further package and/or otherwise transform the data to send via network stack 505 for delivery via network 606 to a node including a communications agent representing a communicant in the communication.

With reference to FIG. 2, block 202 illustrates that the method includes receiving a resource criterion for requesting a resource via a first communication including a message portion including a first message addressed to a first user represented by a first node. Accordingly, a system for processing a request for a resource in a communication includes means for receiving a resource criterion for requesting a resource via a first communication including a message portion including a first message addressed to a first user represented by a first node. For example, as illustrated in FIG. 4a, criterion handler component 402 is configured for receiving a resource criterion for requesting a resource via a first communication including a message portion including a first message addressed to a first user represented by a first node. FIG. 5 illustrates criterion handler component 502 as an adaptation and/or analog of criterion handler component 402 in FIG. 4a. One or more criterion handler components 502 operate in execution environment 501.

Figure 8:
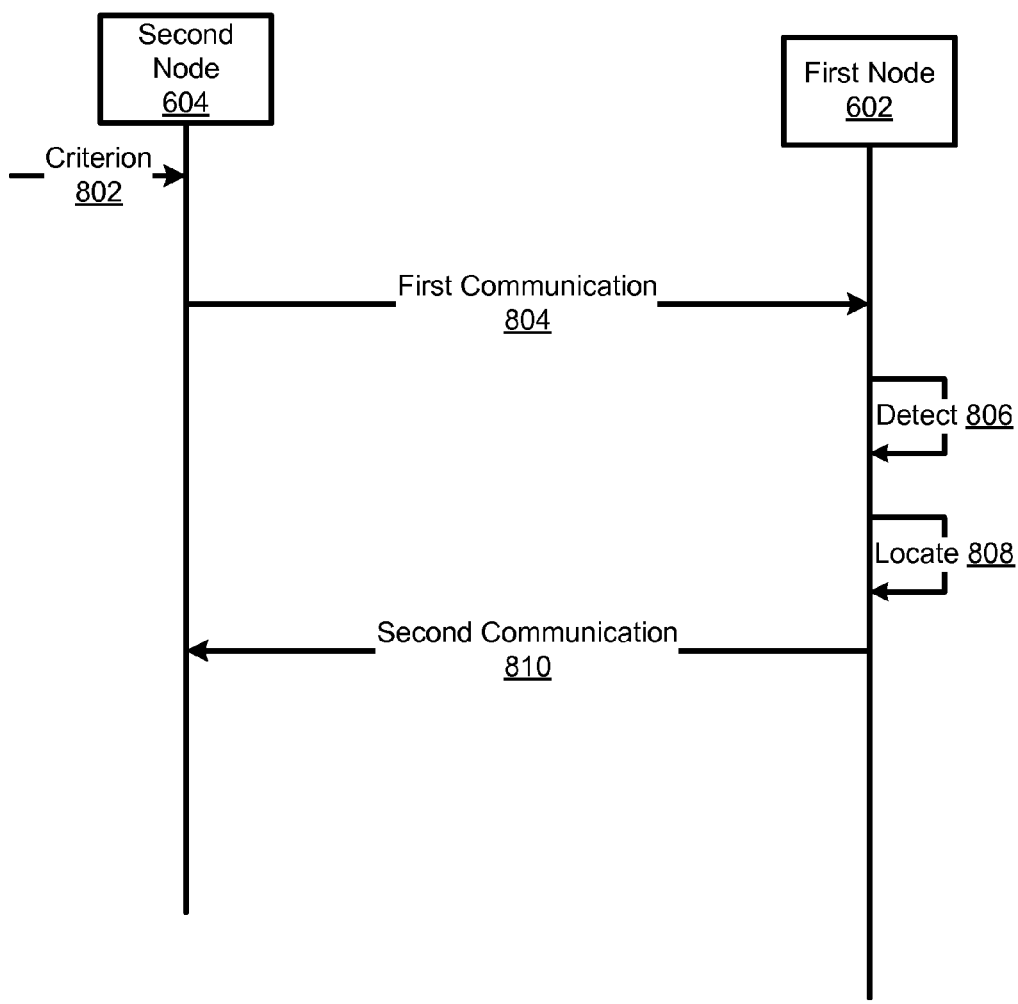
FIG. 8 is a message flow diagram illustrating a message flow in a system for processing a request for a resource in a communication according to an aspect of the subject matter described herein.

FIG. 8 illustrates a criterion message 802 communicated within second node 604 for receiving a resource criterion for sending a request for a resource to a first communicant represented by a communications agent in first node 602.

A second communicant may identify a first communicant to communicate with via a communication over a network. For example, an identifier of the first communicant may be received as input from the second communicant. The identifier may be received to initiate and/or otherwise include the first communicant in a communication. In FIG. 5, presentation controller 513 and/or a UI element handler 511 for recipient UI element 706a in FIG. 6 may receive an alias and/or communications address identifying the first communicant in response to a user input corresponding to recipient UI element handler 706a. The user input may be detected by, for example, input driver 519. Corresponding input information may be routed to presentation controller 513 by GUI subsystem 515 as described above.

The second communicant may provide a message for exchanging in the communication via a message UI element 710a. In FIG. 7, the second communicant may enter a message via a keyboard or other input device. The message to be sent to the first communicant may be presented, in response to detecting the message input by a UI element handler component 511 for a message UI element 710a presented in presentation space 708a.

Figure 7B:
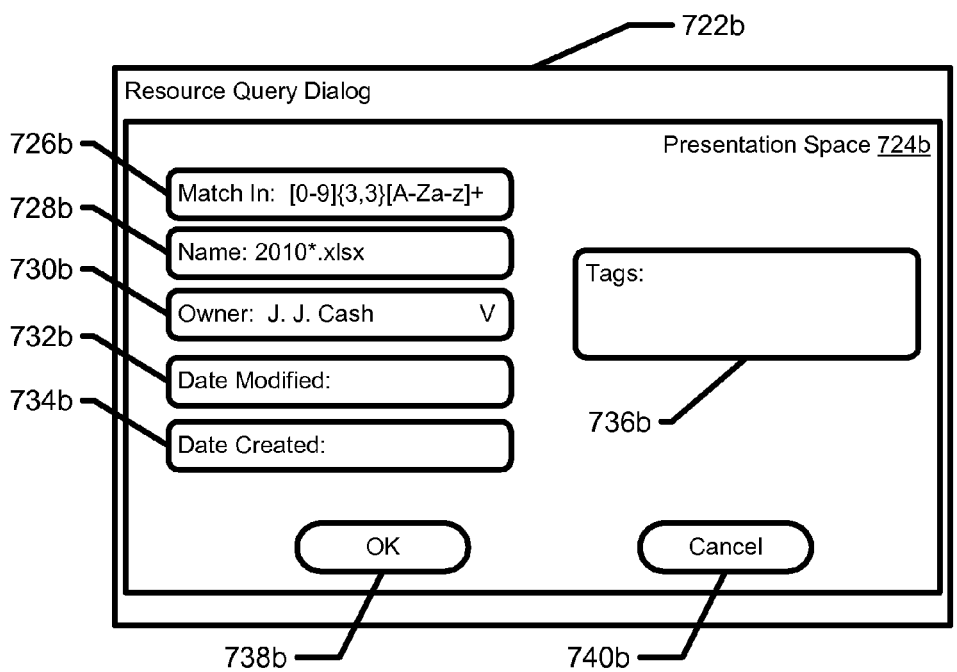
FIG. 7b is a diagram illustrating a user interface presented via a display according to another aspect of the subject matter described herein.

Resource query dialog 722b in FIG. 7b may be presented by presentation controller component 513 and/or one or more UI element handler components 511. Resource query dialog 722b may be presented in response to a user input detected corresponding to request button UI element 714a in FIG. 7a. Resource query dialog 722b may be presented for receiving one or more resource criteria for requesting a resource from the first communicant via a first communications agent representing the first communicant. A resource criterion may be a name or identifier of a resource, such as a URI. A criterion may be more complex and may be expressed in a formal query language, such as structured query language (SQL), for sending to the second communication agent.

Resource query dialog 722b illustrates attributes usable for locating one or more files. Presentation space 724b includes a number of form UI elements for receiving one or more resource criteria by criterion handler component 502. Execution environment 501 may include a single criterion handler component 502 to receive resource criterion via resource query dialog 722b or may include multiple criterion handler components 502. For example, execution environment 501 may include a criterion handler component 502 for each form UI element and/or may include a criterion handler component 502 for each type of form UI element.

"Match In" text box 726b illustrates a text box for receiving a resource criterion for matching content in a resource. "Match In" text box 726b illustrates that a resource criterion may be represented in a regular expression language. Name text box 728b illustrates a form UI element for representing a resource name according to a file system name expression language. Name text box 728b illustrates a resource criterion based on a "wild-card" symbol for matching one or more files or other named resources. Drop-down list UI element 730b illustrates that a request may identify a role associated with a resource as a resource criterion for matching a user, group, and/or other nameable entity associated with a resource. "Date Modified" UI element 732b and "Date Created" UI element 734b illustrated various date and/or time based resource criteria for matching date and/or time attributes of a resource. Text editor UI element 736b illustrates that a tag associated with a resource may be specified as a resource criterion. A resource criterion may be specified so that all or some of the criterion must be met for a resource.

In response to a user input corresponding to "OK" button 738b, form data received based on resource query dialog 722b may be received by criterion handler component 502 as a resource criterion or resource criteria. The resource criterion may be provided and/or otherwise identified to query generator component 504 to generate an attachment request for sending to the first communications agent in first node 602 along with the message received via message UI element 710*a* in FIG. 7*a*.

Returning to FIG. 2, block 204 illustrates that the method further includes sending, via a network to the first node, the first communication including a request portion that includes an attachment request based on the resource criterion. Accordingly, a system for processing a request for a resource in a communication includes means for sending, via a network to the first node, the first communication including a request portion that includes an attachment request based on the resource criterion. For example, as illustrated in FIG. 4*a*, query generator component 404 is configured for sending, via a network to the first node, the first communication including a request portion that includes an attachment request based on the resource criterion. FIG. 5 illustrates query generator component 504 as an adaptation and/or analog of query generator component 404 in FIG. 4*a*. One or more query generator components 504 operate in execution environment 501.

FIG. 8 illustrates first communication 804 including an attachment request in a request portion of first communication 804. FIG. 8 illustrates second node 604 sending first communication 804 and first node 602 receiving first communication 804.

A query may be specified in a standard query language, such as structured query language (SQL). In an aspect, query generator component 504 may represent a specified resource criterion in an attachment request based on capabilities of a first communications agent identified via a previous communication between first node 602 and second node 604.

In response to an indication to initiate a communication and/or to otherwise send data in a communication, message data whether voice, text, and/or image data may be sent by communications agent 503 in second node 604 via communications protocol component 507 for delivery to the first communications agent representing the identified first communicant. For example, a user input corresponding to send button 712*a* may be received by presentation controller component 513 via input driver 519 and GUI subsystem 515 as described above. Presentation controller component 513 may provide one or more portions of data to send in the communication to one or more content handlers according to the types of the one or more portions. For example, a text message may be provided to a text/plain content handler 509 for processing content types having text/plain and/or text/* MIME type identifiers. Query generator component 504 may include and/or may be included in a content handler instructed to process resource criterion information received from one or more criterion handler component 502 into an attachment request included in a request portion of the communication to be sent.

One or more representations of the attachment request may be generated based on the resource criterion. Query generator component 504 in FIG. 5 may format, encode, and/or otherwise transform the received resource criterion information into an attachment request in a format suitable for first node 602. FIG. 9*a* illustrates email communication 900*a*. Email communication 900*a* is illustrated formatted as a multipart/mixed content type including request portion 902*a*. Request portion 902*a* may be identified as a request by its location in the communication and/or by its content type. A request portion content type may be detected based on content included in the message and/or based on metadata such as content-type header 904*a* identifying a MIME type identifier, such as "application/attachment-query", defined for representing one or more resource criteria in an attachment request. The "application/attachment-query" MIME type identifier is exemplary. Other MIME type identifiers exist that may be defined to identify an attachment request, and new MIME type identifiers for identifying a request portion in a communication may be defined.

A content type identifying a request portion may be included in a representation of an attachment request. For example, a content handler 509 may be configured to detect a request portion based on detecting valid XQuery and/or SQL content, as described above. A content type identifier may be a position and/or location in a communication. The position or location may be absolute or relative. For example, a schema for a communication may define that a request portion in a communication is included in the communication at the end of the communication. There may be one or more request portions at the end. In another aspect, a schema for a communication may specify that a portion of a communication following a message portion is a request portion. Other request portions may follow. If no attachment request is included, the request portion may include no content or may include an indicator that no attachment request is included.

FIG. 9*a* illustrates that "application/attachment-query" MIME type identifier may identify a schema for an XML-based language for specifying attachment-query documents. FIG. 9*a* illustrates attachment-query document 906*a*. Attachment-query document 906*a* includes criterion tag elements 908*a* corresponding to the form elements in FIG. 7*a*. A criterion tag element 908*a* identifies a resource criterion name, such as "content" indicating that the criterion is associated with the content of a resource. A criterion tag element 908*a* also identifies a criterion type, such as "regex" indicating that the criterion is represented according to a particular regular expression language. A criterion tag element 908*a* identifies a value for matching according to the type of the criterion. FIG. 9*a* illustrates "and" tag 910*a* indicating that all the resource criteria must be met for identifying a resource. An "or" tag (not shown) may be defined by a schema for attachment-query documents. Other operator elements and operator precedence may be defined by the schema. Grouping elements for managing operator precedence, such as parenthesis element, may be defined by the schema.

A request portion generated by query generator component 504, along with a message portion and any other data to include in the communication, may be provided and/or otherwise identified to content manager component 506 for sending in the communication. Content manager component 506 and com-out component 521 may further package and/or transform the data so that it is suitable for sending in the communication. Com-out component 521 may provide the resource portion, the message portion, and any other data for sending in the communication in representations suitable for sending by communications protocol component 507 to the first communications agent in first node 602 in first communication 804 in FIG. 8.

With reference to FIG. 3, block 302 illustrates that the method includes receiving, via a network by a first node, a first communication including a first message addressed to a first user. Accordingly, a system for processing a request for a resource in a communication includes means for receiving, via a network by a first node, a first communication including a first message addressed to a first user. For example, as illustrated in FIG. 4*b*, com-in component 412 is configured for receiving, via a network by a first node, a first communication including a first message addressed to a first user. FIG. 5 illustrates com-in component 512 as an adaptation and/or analog of com-in component 412 in FIG. 4*b*. One or more com-in components 512 operate in execution environment 501.

The communication illustrated by first communication 804 in FIG. 8 may be received by a communications agent in first node 602. The first communication may be delivered to first node 602 based on an address of the communications agent identifying a first communicant represented by the communications agent 503 instance of first node 602. Communications agent 503 may represent other communicants having other addresses. The address in first communication 804 indicates that the content of first communication 804 including a message portion is addressed to the first communicant.

The first communication illustrated by first communication 804 in FIG. 8 may be received in one or more packets via network 606 by network stack 505 and communications protocol component 507 in an instance of and/or analog of execution environment 501 including and/or otherwise provided by first node 602. The data in the communication may be received by com-in component 512. Com-in component 512 may provide the data to content manager component 506. Content manager component 506 may determine one or more content types of the data. The content and/or portions of the content may be provided to one or more content type handler components 509 based on the one or more content types identified by content manager component 506. For example, FIG. 9a illustrates message portion 912a including "text/plain" MIME type identifier 914a as a content type identifier. Message portion 912a may be provided to a text/plain content handler 509. Audio data in a voice communication may be provided to an audio content handler component 509, and video data in a video communication may be provided to a video content handler component 509.

Returning to FIG. 3, block 304 illustrates that the method further includes detecting, by the first node, an attachment request included in the first communication. Accordingly, a system for processing a request for a resource in a communication includes means for detecting, by the first node, an attachment request included in the first communication. For example, as illustrated in FIG. 4b, query content handler component 414 is configured for detecting, by the first node, an attachment request included in the first communication. FIG. 5 illustrates query content handler component 514 as an adaptation and/or analog of query content handler component 414 in FIG. 4b. One or more query content handler components 514 operate in execution environment 501.

FIG. 8 illustrates detect message 806 communicated within first node 602 for detecting one or more attachment requests for locating the resource.

Content manager component 506 may detect content type information described above to detect a request portion of a communication. For example, the content illustrated in FIG. 9a may be received in first communication 804. Content manager component 506 may detect "application/attachment-query" MIME type identifier in content-type header 904a. The "application/attachment-query" MIME type identifier may be defined to identify an attachment request based on one or more resource criteria for identifying a requested resource. Content manager component 506 may identify request portion 902a as including the attachment request.

In response to detecting an attachment request in first communication 804, content manager component 506 may provide the attachment request and/or a resource criterion identified to query content handler component 514. For example, query content handler component 514 may be configured to operate according to a schema defining a format and/or a vocabulary for an XML-based language for attachment-query documents. Communication manager component 506 may provide attachment-query document 906a, as an attachment request, to query content handler component 514.

Query content handler component 514 may operate according to an attachment-query schema. In an aspect, a query content handler component may process more than one attachment request content type. Alternatively or additionally, execution environment 501 may include multiple query content handlers 514 for supporting multiple attachment request content types.

Figure 7C:
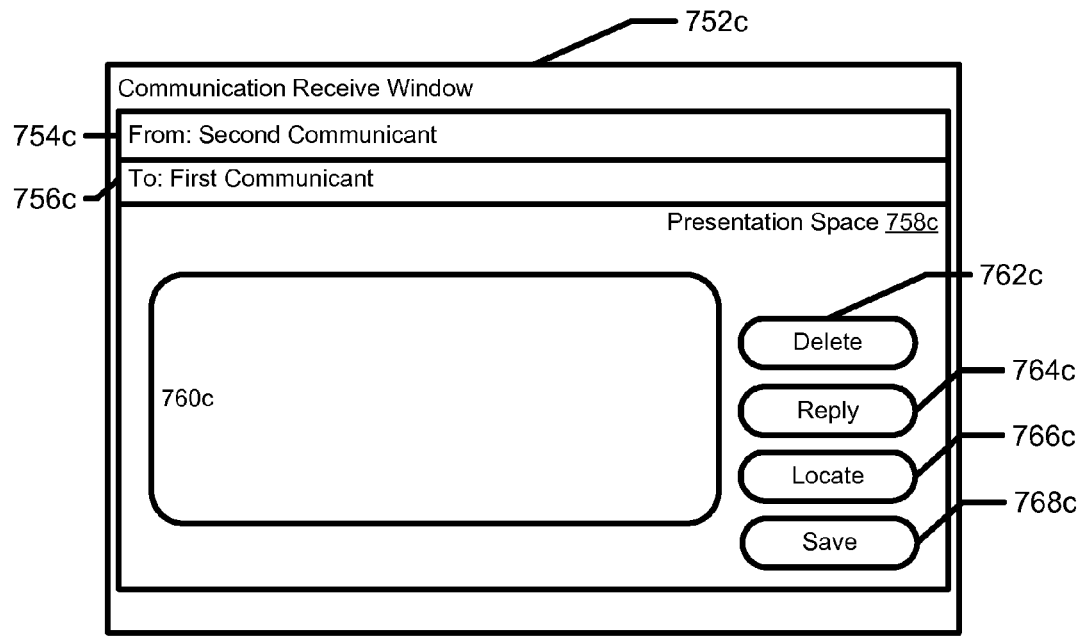
FIG. 7c is a diagram illustrating a user interface presented via a display according to another aspect of the subject matter described herein.

FIG. 7c illustrates a user interface presented by a communications agent for presenting data received in a communication with another communications agent. Communication receive window 752c may be presented by presentation controller 513 and/or one or more UI element handler components 511 operating in an instance, adaptation, and/or analog of execution environment 501 including and/or otherwise provided by first node 602. "From" UI element 754c may include an identifier of the second communicant responsible for sending first communication 804. "To" UI element 756c may include an identifier of the first communicant represented by the first communications agent in first node 602 illustrated by communications agent 503 in FIG. 5. Text, image, and/or video content received in the communication may be presented in content pane 760c in presentation space 758c of communication receive window 752c. User interface controls for managing the communications and/or content received in the communication may be represented by various types of UI elements.

In FIG. 7c, communication receive window 752c illustrates delete button 762c for receiving an input to delete content received in first communication 804, reply button 764c for creating and/or sending data in a second communication in reply to the received first communication 804, locate button 766c for locating a resource based on attachment-query document 906a detected in request portion 902a in first communication 804, and a save button 768c for saving the message portion and other content received in first communication 804 in a particular folder and/or location in a data store in the execution environment of first node 602. When an attachment request is not detected, locate button 766c may be presented as inactive or not presented in second communication receive window 752c.

Returning to FIG. 3, block 306 illustrates that the method yet further includes locating a resource based on the attachment request. Accordingly, a system for processing a request for a resource in a communication includes means for locating a resource based on the attachment request. For example, as illustrated in FIG. 4b, resource location component 416 is configured for locating a resource based on the attachment request. FIG. 5 illustrates resource location component 516 as an adaptation and/or analog of resource location component 416 in FIG. 4b. One or more resource location components 516 operate in execution environment 501.

FIG. 8 illustrates locate message 808 communicated within first node 602 for initiating a search and/or otherwise for locating a resource based on the attachment request.

In an aspect, communications agent 503 in FIG. 5 may invoke resource location component 516 automatically to locate one or more resources based on an identified resource criterion in an attachment request and in response to detecting an attachment request in a communication. In another aspect, communications agent 503 may invoke resource location component 516 automatically to locate one or more resources based on an attachment request in a communication in response to detecting an indication to present, via a output device, some or all of a message received in a message portion of the communication. Resource location component 516 may be invoked and/or may operate based on the attachment request and/or resource criterion identified to locate a resource prior to, during, and/or after other content received in the communication is processed. Processing may include, for example presenting a message included in the message portion in message UI element 760c in FIG. 7c in communication receive window 752c.

In another aspect, communications agent 503 operating in first node 602 may present a UI control, such as locate button 766c, to receive an instruction from the first communicant to locate a resource based on an attachment request. Alternatively or additionally, communications agent 503 may identify a resource based on an attachment request via resource location component 516 in response to detecting user input for replying, forwarding, and/or otherwise responding to the received communication. Presentation controller component 513 may receive input information in response to a detected user input that corresponds to reply button 764c. Presentation controller component 513 may interoperate with resource location component 516 to identify one or more resources that match a resource criterion identified by the attachment request prior to, during, and/or after the first communicant provides message content for the reply. Alternatively or additionally, communication receive window 752c or an analogous user interface may be presented for receiving data to send in a second communication in reply to first communication 804. The user interface for replying to first communication 804 may include locate button 766c and/or an analogous UI control for receiving an indication from the first communicant to locate a resource based the attachment request.

The method illustrated in FIG. 2 may include additional aspects supported by various adaptations and/or analogs of the arrangement of components in FIG. 4a. As described above, in one aspect a resource may be located automatically in response to detecting the attachment request. In another aspect, locating a resource may include presenting a locator UI element representing an attachment request. Locate button 766c in FIG. 7c exemplifies one type of locator UI control. Locate button 766c may be presented by presentation controller component 513 as described above. A user input corresponding to a locator UI control, such as locate button 766c, may be detected by presentation controller component 513. Presentation controller component 513 may instruct resource location component 516 to locate the resource based on an attachment request represented by the locator UI control.

In another aspect, a locator UI element may be presented to receive one or more additional resource criteria from a user. Based on the locator UI element and input from the user, resource location component 516 may receive criterion information identifying an additional criterion. Resource location component 516 may locate one or more resources in response to receiving the additional criterion. For example, a resource criterion may identify a resource file name, such as "febAccounts.xlsx". A file locator dialog may be presented by presentation controller component 513 including a representation of the file name. The file locator dialog may be presented to receive input for navigating to a directory or folder including a file with a matching file name. Based on user input, a folder and/or directory is identified as an additional resource criterion.

In another example, a request may include a resource criterion that matches files that include content with a content type matching text/plain MIME type identifier and that were created in the last seven days since the communication including the attachment request was received. A locator dialog may be presented including representations of all files in a node that match the resource criteria. User input to select for inclusion and/or select for exclusion identifies an additional criterion that identifies at least a portion of the files represented in the locator UI element.

Returning to FIG. 3, block 308 illustrates that the method additionally includes sending, to a second node, a second communication including the located resource, as an attachment, and including a second message addressed to a second user. Accordingly, a system for processing a request for a resource in a communication also includes means for sending, to a second node, a second communication including the located resource, as an attachment, and including a second message addressed to a second user. For example, as illustrated in FIG. 4b, the access director component 418 is configured for sending, to a second node, a second communication including the located resource, as an attachment, and including a second message addressed to a second user. FIG. 5 illustrates access director component 518 as an adaptation and/or analog of access director component 418 in FIG. 4b. One or more access director components 518 operate in execution environment 501.

FIG. 8 illustrates second communication 810, including the resource located based on the attachment request, sent by first node 602. The resource is included as an attachment in second communication 810 to a second message included in a message portion of second communication 810. FIG. 8 illustrates second communication 810 received by second node 604.

Resource location component 516 may identify to access director component 518 one or more resources in a data base, a file system, and/or other resource data store based on the attachment request. Access director component 518 may identify a service for generating and/or accessing a resource. Access director component 518 may interoperate with the service to generate and/or otherwise access the located resource(s). A data store and/or service accessed by access director component 518 and/or by a component operating on behalf of access director component 518 may be included in the execution environment of first node 602. A data store and/or service accessed by access director component 518 may be included in an execution environment of another node and accessed via network 606.

In response to accessing a resource located by resource location component 516, access director component 518 may provide and/or otherwise identify the resource to a suitable content handler component 509 based on a content type of the resource. The content handler component 509 may decode, encode, reformat, translate, and/or otherwise transform the resource for including in second communication 810.

FIG. 9b illustrates communication 900b that may be communicated in second communication 810. Second message portion 902b illustrates a message portion in second communication 810. Note that a message portion may be empty as illustrated by message portion 902b. Attachment portion 904b illustrates the resource as image data encoded for sending in a text-based communication.

Message portion 902b and attachment portion 904b may be provided by respective content handler components 509 to content manager component 506. Content manager component 506 may construct the content as illustrated in FIG. 9b and/or otherwise provide for encoding, translating, combining, and/or otherwise preparing the content for sending in second communication 810. As described above, communication manager component 506 may send second communication 810 via com-out component 521 communicatively coupling content manager component 506 to communications protocol component 507 and/or network stack component 505 for sending second communication 810 via network 606 to second node 604 addressed to the second communicant represented by the communications agent operating in second node 604.

Returning to FIG. 2, block 206 illustrates that the method yet further includes receiving, by a second node representing a second user, a second communication including, based on the request portion, the resource, as an attachment, and a second message addressed to the second user. Accordingly, a system for processing a request for a resource in a communication includes means for receiving, by a second node representing a second user, a second communication including, based on the request portion, the resource, as an attachment, and a second message addressed to the second user. For example, as illustrated in FIG. 4a, content manager component 406 is configured for receiving, by a second node representing a second user, a second communication including, based on the request portion, the resource, as an attachment, and a second message addressed to the second user. FIG. 5 illustrates content manager component 506 as an adaptation and/or analog of content manager component 406 in FIG. 4a. One or more content manager components 506 operate in execution environment 501.

Data sent in second communication 810, by first node 602, may be received by com-in component 512 operating in an instance, adaptation, and/or analog of execution environment 501 including and/or provided by second node 604. The received communication includes a message addressed to the second communicant and an attachment including the resource located based on the attachment request identified by first communication 804. Content manager component 506 may detect the message portion, such as message portion 902b in second communication 810. Content manager component 506 may detect an attachment portion, such as attachment portion 904b in second communication 810. Message portion 902b and attachment portion 904b may be provided to suitable content handler components 509 based on the content types of the message portion and the attachment portion detected by content manager component 506.

In an aspect, an attachment portion that is a response to an attachment request sent in a previous message may include information identifying the attachment as a response. For example, an attachment request may be sent with a correlator and a located resource received in an attachment may identify the correlator to identify the attachment as a response to the particular attachment request previously sent.

Figure 7D:
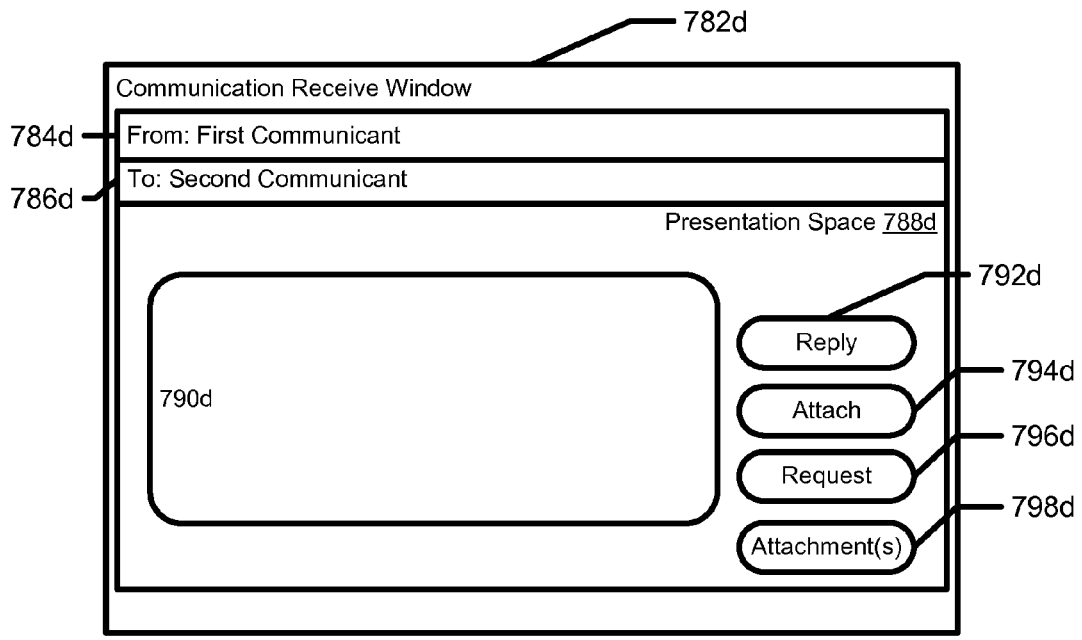
FIG. 7d is a diagram illustrating a user interface presented via a display according to another aspect of the subject matter described herein.

In an aspect, accessing a resource received in response to an attachment request includes presenting, via an output device, an attachment user interface control representing the resource. In response to detecting a user input corresponding to the attachment user interface control, the resource may be accessed. One or more content handler components 509 may process data received in second communication 810 to represent that data in a format for presenting to the second communicant. Communication receive window 782d in FIG. 7d illustrates user interface components for presenting the message, to the second communicant, received in second communication 810. Communication receive window 782d is similar to first communication receive window 752b, but includes an attachment(s) UI element 798d based on the attachment portion in second communication 810.

In an aspect, access handler component 523 may be invoked to access the resource in response to a user input corresponding to attachments button 798d. For example, an input driver component 519 may detect an input and GUI subsystem 515 may associate the detected input with a location in a display where attachments button 798d is presented. GUI subsystem 515 may invoke presentation controller component 513 and/or a UI element handler component 511 associated with attachments button 798d to process the detected user input. Access handler component 523 may retrieve the resource from the communication. The content of the communication may be stored in one or more data stores accessed via one or more data storage systems, such as file system/DBMS component 525 and/or a processor memory included in execution environment 501 of second node 604.

In another aspect, the resource may be accessed automatically without receiving an indication from the second communicant to access the resource. For example, content manager component 506 may detect the attachment portion in the content received in second communication 810. Content manager component 506 may provide a representation of the resource included in the attachment portion to access handler component 523 in response to detecting the access information. Access handler component 523 may decode, reformat, translate, and/or otherwise transform the representation of the resource for presenting to the second communicant and/or for storing in a location in a data store accessed via a storage subsystem.

The method illustrated in FIG. 2 may include additional aspects supported by various adaptations and/or analogs of the arrangement of components in FIG. 4a. The method illustrated in FIG. 3 may include additional aspects supported by various adaptations and/or analogs of the arrangement of components in FIG. 4b. In one aspect, the first communication in the method illustrated in FIG. 2 and in the method illustrated in FIG. 3 may include a text message, an email, audio data, an instant message, and/or image data. In another aspect, the attachment request may be represented according to a criterion schema. The criterion schema defines a format for representing the attachment request and/or defines a vocabulary of valid values includable in the attachment request. Query generator component 504 may generate an attachment request according to a criterion schema and query content handler component 514 may determine whether an attachment request is valid according to the schema. Query content handler component 514 may also identify an attachment request based on a criterion schema and/or identify a resource criterion in the attachment request based on a criterion schema.

A criterion schema may be identified by a schema identifier, such as a MIME type identifier and/or a URI. Second node 604 may receive a criterion schema identifier sent from first node 602 prior to sending first communication 804. Alternatively or additionally, a schema may be preconfigured in a communications agent. For example, a content handler component 509 may operate on a request portion of a communication according to a schema for specifying an attachment request. The rules of the schema may be read from a configuration data store and/or may be included in one or more instructions in the attachment request content hander component 509. Query content handler component 504 and/or query content handler component 514 may receive a criterion schema from any of the sources described and/or any other suitable sources.

In another aspect, one or more resource criteria may be predefined. A resource criterion may be defined by a criterion schema and/or may be defined, for example by a user, according to a criterion schema. One or more resource criteria may be included in an attachment request expression or condition. Some or all of the attachment request expression or condition may be predefined, generated by query generator component 504, and/or generated based on user input. Second node 604 may receive a predefined attachment request and/or a predefined attachment request condition sent from first node 602.

A predefined criterion and/or condition allows the first node to restrict and/or otherwise control attachment requests and/or may be provided for the convenience of communicants in specifying attachment requests.

As described above with respect to the method illustrated in FIG. 2, an attachment request may be received via a user interface element including a form element. In an aspect, an attachment request may specify a form element. For example, an attachment requested by a second communicant of second node 604 may be information known to a first communicant of first node 602. An attachment request may specify a user interface element including a form element. Locating the resource by first node 602 may include presenting the user interface element and receiving input from the first communicant corresponding to the form element. The resource sent by first node 602 as an attachment in second communication 810 may include information that corresponds to the form element and that is based on the input received from the first communicant. Exemplary user interface elements that may include and/or may be included in form elements include a window, a textbox, a slider, a list box, a drop-down list, a spinner, a menu, a menu item, a toolbar, a ribbon, a combo box, a tree, a grid, a navigation tab, a scrollbar, a label, a tooltip, text in various fonts, a balloon, a dialog box, and/or a button.

An attachment request may be based on a date, a time, a length of time, a file type, a database record key, content of the resource, a content type identifier, a format rule, a vocabulary, a role of a user, a security attribute, a location in a data storage system such as a file system, an attribute of an identified resource, a size, a task, a transaction, a state, a user, a group, a requester, a relationship including a requesting user and a responding user, a keyword, a tag, a folder, and/or a path portion of a resource identifier, to name a few examples.

As described above, a matching condition may include and/or otherwise identify an attachment request. A located resource must meet the matching condition in an aspect. Alternatively or additionally, an attachment request may include an instruction and/or input for generating a resource, and locating the resource may include generating the resource. Generating a resource may include creating the resource and/or may include modifying and/or otherwise transforming an existing resource.

In the method illustrated in FIG. 2, sending a first communication may include storing a criterion content type identifier in the first communication, as illustrated by content-type header 904a in FIG. 9a. Analogously, detecting an attachment request in the method illustrated in FIG. 3 may include detecting a criterion content type identifier in a first communication to determine that a request portion in the first communication includes an attachment request. The criterion content type may be defined to indicate that the request portion includes the attachment request.

A criterion content type identifier may include a MIME type identifier. In FIG. 9a, "application/attachment-query" in content-type header 904a illustrates a criterion content type identifier. A MIME type identifier may identify a criterion schema and/or a schema for a request portion and/or an attachment in a request portion. A criterion content type identifier may be any detectable information that identifies any of a criterion schema and/or a schema for a request portion and/or an attachment in a request portion.

In various aspects, a resource criterion may be detected and/or represented based on various syntaxes, grammars, vocabularies, and/or languages. For example, a resource criterion may be identified and/or represented according to a file system search syntax, a regular expression language, a structured query language (SQL) query, a universal resource identifier schema, an XPATH based language, an XQuery based language, an XML based language, an HTML based language (form-based), and/or a keyword-value pair based language.

A request portion including an attachment request in a communication may be received by a first communicant and sent on behalf of a second communicant via a first communications protocol, and a message in the communication may be exchanged in the communication via a second communications protocol. For example, a message may be sent from second node 604 to first node 602 via an RTP session according to the specification of real-time transport protocol. The second communicant may send an attachment request in the communication session via a request-reply protocol such as specified for XMPP. Both the XMPP request and the RTP session may be included in a communication.

Exemplary resources that may be requested via an attachment request include a file, a program component, a data base record, video data, audio data, markup language, binary data, text data, an output of a service. Requested resources may be pre-existing, volatile, and/or generated in response to the request.

A request portion in a communication may be identified and detected in the communication based on a term in a vocabulary defined by the criterion schema to indicate that the request portion includes the attachment request and/or includes a location defined by a format specification to indicate that the request portion includes the attachment request. For example, a content handle component 509 may be configured to detect the <attachment-query> tag in attachment-query document 906a in FIG. 9a. Content handler component 509 may detect and/or otherwise identify attachment-query document 906a as a request portion. Content handler component 509 may be configured to detect an "application/attachment-query" MIME type identifier in a content-type header, or it may be configured not to detect the application/attachment-query MIME type identifier while still detecting the request portion based on the <attachment-query> tag.

As described above, an attachment including a request resource may be identified and/or detected in a communication based on a content type identifier. A content type identifier for an attachment may be represented and/or detected based on an identifiable location in the communication defined to include some or all of the attachment, a detectable format of some or all of the attachment, a detectable data entity included in a vocabulary specified for the attachment, and/or a symbolic identifier defined to indicate that the communication includes the attachment.

An attachment in a communication may be sent and/or received in the communication via a first communications protocol, and a message in the communication may be, respectively, sent and/or received via a second communications protocol. As described above, a message may be communicated via voice data sent according to RTP protocol. An attachment request and a response including an attachment may be communicated according to a request/reply protocol specified by XMPP.

An attachment may be included in a communication based on a requested-attachment schema defining to the second node at least one of a format and a vocabulary for processing the attachment.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A computer program product executable by a processor and embodied on a non-transitory computer-readable medium including memory, comprising:
    code for receiving a criterion at a first node via at least one network, the receiving including receiving a textual search query including one or more words from a requesting user;
    code for, in response to the criterion, sending from the first node via the at least one network a first signal to a second node including a first message, the first signal further including a resource request that is valid according to a criterion schema defining at least one of a format and a vocabulary for the resource request, the criterion schema being predefined and the resource request being operable for use in identifying content, the resource request being based on a relationship involving the requesting user and at least one other user such that the resource request results in an initiation of a search for the content which is associated with a group including the at least one other user that includes a plurality of other users;
    code for receiving at the first node via the at least one network a second signal from the second node including the content that is included in the second signal based on a schema defining at least one of a format and a vocabulary for processing, and including a second message; and
    code for, in response to the second signal, presenting at least a portion of the content in connection with the second message.

2. The computer program product of claim 1, wherein the computer program product is operable such that the criterion schema is predefined in a communication agent for specifying the resource request that is sent.

3. The computer program product of claim 1, wherein the computer program product is operable such that the one or more words includes one or more tags.

4. The computer program product of claim 1, wherein the computer program product is operable such that the textual search query is included with the criterion.

5. The computer program product of claim 1, wherein the computer program product is operable such that that, in response to receipt, the at least portion of the content is automatically presented in connection with the second message.

6. The computer program product of claim 1, wherein the computer program product is operable such that the schema identifier is received at the first node from the second node before the first node sends the first signal.

7. A computer program product executable by a processor and embodied on a non-transitory computer-readable medium including memory, comprising:
    code for receiving a criterion from a first user at a first node via at least one network, in connection with a textual query including one or more words that results in initiation of a resource locating process at a second node;
    code for, in response to the criterion, sending from the first node via the at least one network a first signal to the second node including a first message, the first signal further including a resource request that is valid according to a criterion schema defining at least one of a format and a vocabulary for the resource request and is identified by a schema identifier, the resource request further being operable for use in identifying content and further being based on a group and a relationship involving the first user and at least one other user, such that the resource request is operable for being utilized in connection with the resource locating process;

code for receiving at the first node via the at least one network a second signal from the second node including the content that is included in the second signal based on a schema defining at least one of a format and a vocabulary for processing, and including a second message; and code for, in response to the second signal, presenting at least a portion of the content in connection with the second message.

8. The computer program product of claim 7, wherein the computer program product is operable such that the first signal including the first message is addressed to at least one user.

9. The computer program product of claim 7, wherein the computer program product is operable such that the resource request is generated based on receipt of the criterion in connection with the textual query.

10. The computer program product of claim 7, wherein the computer program product is operable such that the schema identifier includes a universal resource identifier (URI).

11. The computer program product of claim 7, wherein the computer program product is operable such that the format includes at least one of one or more image format types, one or more video format types, one or more markup languages, one or more scripting languages, one or more byte code, and one or more machine code.

12. The computer program product of claim 7, wherein the computer program product is operable such that the resource request requests a resource in the form of the content.

13. The computer program product of claim 7, wherein the computer program product is operable such that that, in response to receipt, at least a portion of the content is automatically presented in connection with the second message.

14. The computer program product of claim 7, wherein the computer program product is operable such that the first signal includes at least one of a text message, an email, audio data, an instant message, and image data.

15. The computer program product of claim 7, wherein the computer program product is operable such that the resource request is based on at least one of content of a resource, a role of a user, a security attribute, an attribute of an identified resource, a size, a task, a transaction, a state, a user, a requester, a relationship including a requesting user and a responding user, a keyword, a tag, a folder, and a path, and the resource request includes a request for at least one of a file, a program component, a data base record, video data, audio data, markup language, binary data, text data, and an output of a service, wherein the computer program product is operable such that the resource request includes an attachment request, and wherein the computer program product is operable such that the first signal is a first communication.

16. The computer program product of claim 7, wherein the computer program product is operable such that the vocabulary defines valid values.

17. The computer program product of claim 7, wherein the computer program product is operable such that the resource request is based on a security attribute.

18. The computer program product of claim 7, wherein the computer program product is operable such that the resource request is based on an output of a service.

19. The computer program product of claim 7, wherein the computer program product is operable such that the presenting the at least portion of the content in connection with the second message includes presenting a representation of the at least portion of the content in connection with the second message, and further presenting the at least portion of the content in response to user input in connection with the representation.

20. The computer program product of claim 7, wherein the computer program product is operable such that the resource request is based on markup language.

21. The computer program product of claim 7, wherein the computer program product is operable such that the textual query is associated with a standard query language.

22. The computer program product of claim 7, wherein the computer program product is operable such that the textual query is specified by a structured query language (SQL).

23. The computer program product of claim 7, wherein the computer program product is operable such that the resource request is operable for being based on the group, by receipt of a selection of the group.

24. The computer program product of claim 7, wherein the computer program product is operable such that the criterion is received from the first user in response to user input corresponding to a button.

25. A system, comprising:
a first node including a processor and memory, the first node configured for:
receiving a criterion at the first node via at least one network, the criterion including a textual search query having one or more words for being used in connection with initiating a search for content;
in response to the criterion, sending from the first node via the at least one network a first signal to a second node including a first message, the first signal further including a resource request that is valid according to a criterion definition defining at least one of a format and a vocabulary for the resource request, the criterion definition being predefined and the resource request being associated with a relationship between a requesting user and at least one other user such that the resource request is capable of being used in connection with searching for at least a portion of the content which is associated with the at least one other user;
receiving at the first node via the at least one network a second signal from the second node including the at least portion of the content based on a definition defining at least one of a format and a vocabulary for content processing, and including a second message; and
in response to the second signal, causing presentation of at least part of the content in connection with the second message.

26. A system, comprising:
a first node including a processor and memory, the first node configured for:
receiving a criterion at the first node via at least one network, the criterion including a textual search query having one or more words for being used in connection with initiating a search for content;
in response to the criterion, sending from the first node via the at least one network a first signal to a second node including a first message, the first signal further including a resource request that is valid according to a criterion specification specifying at least one of a format and a vocabulary for the resource request, the criterion specification being identified by an identifier involving a universal resource identifier (URI), and the resource request being based on a relationship associated with a requesting user and at least one other user such that the resource request is capable of being used in connection with searching for at least a portion of the content which is associated with the at least one other user;
receiving at the first node via the at least one network a second signal from the second node including the at least portion of the content based on a specification specifying at least one of a format and a vocabulary, and including a second message; and in response to the second signal, providing code for allowing presentation of at least part of the content in connection with the second message.

\* \* \* \* \*